No. 729,971. PATENTED JUNE 2, 1903.
L. A. SPROUL.
MACHINE FOR HARVESTING BROOM CORN OR THE LIKE.
APPLICATION FILED JULY 31, 1902.
NO MODEL. 6 SHEETS—SHEET 1.
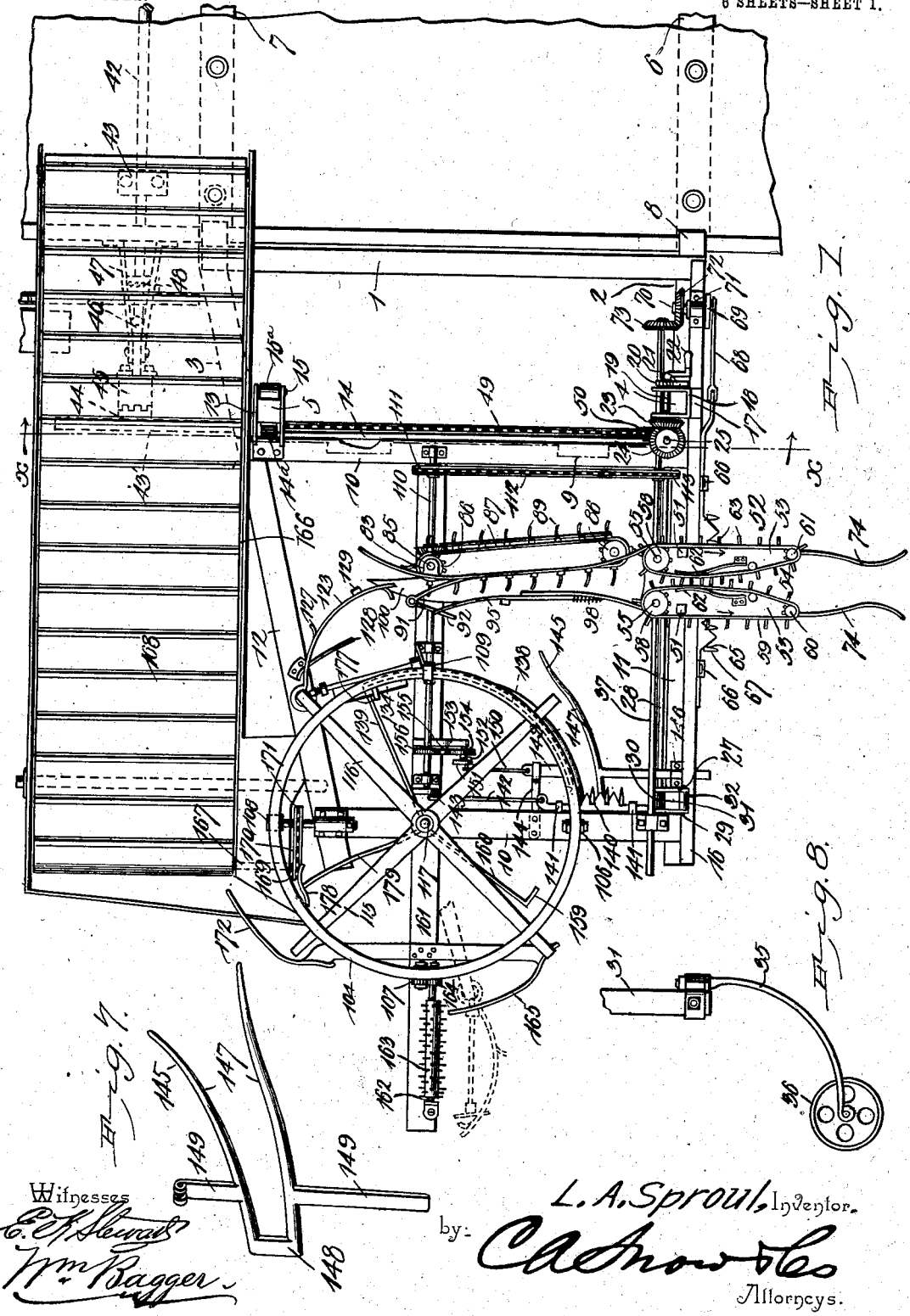
Witnesses
L. A. Sproul, Inventor.
by C. A. Snow & Co.
Attorneys.

No. 729,971. PATENTED JUNE 2, 1903.
L. A. SPROUL.
MACHINE FOR HARVESTING BROOM CORN OR THE LIKE.
APPLICATION FILED JULY 31, 1902.
NO MODEL. 6 SHEETS—SHEET 2.
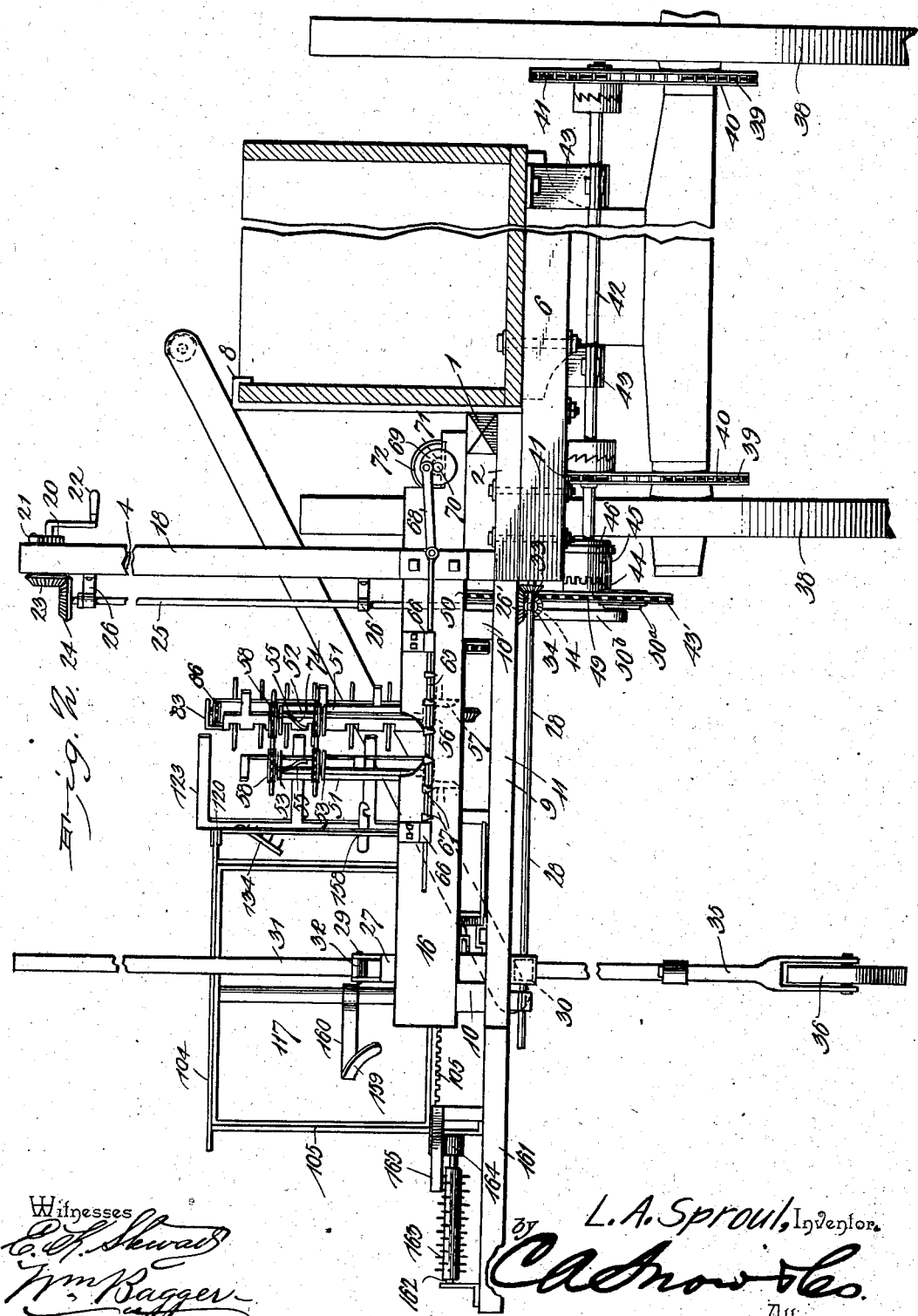
Witnesses
E. F. Stewart
Wm. Bagger
L. A. Sproul, Inventor.
C. A. Snow & Co.
Attorneys

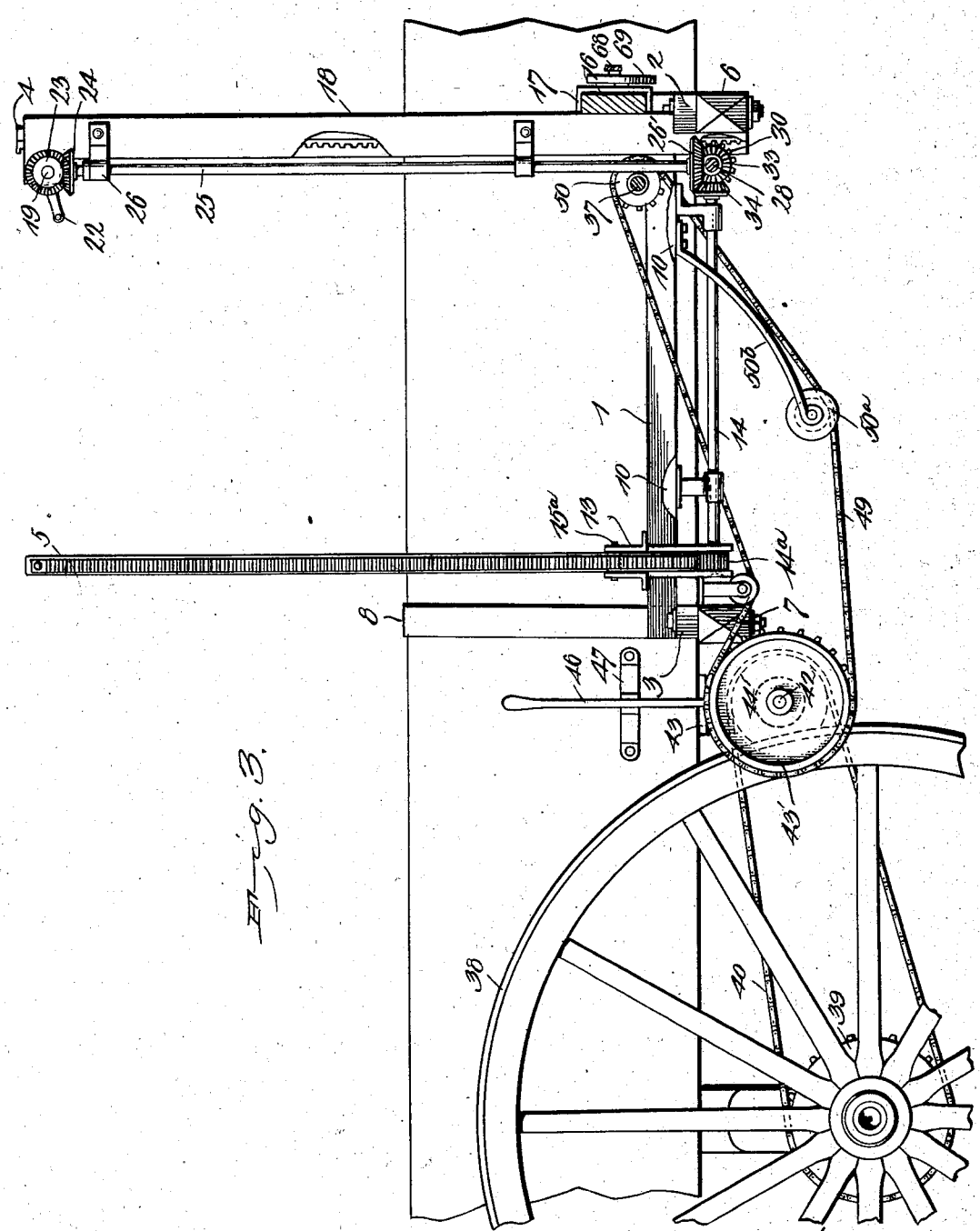

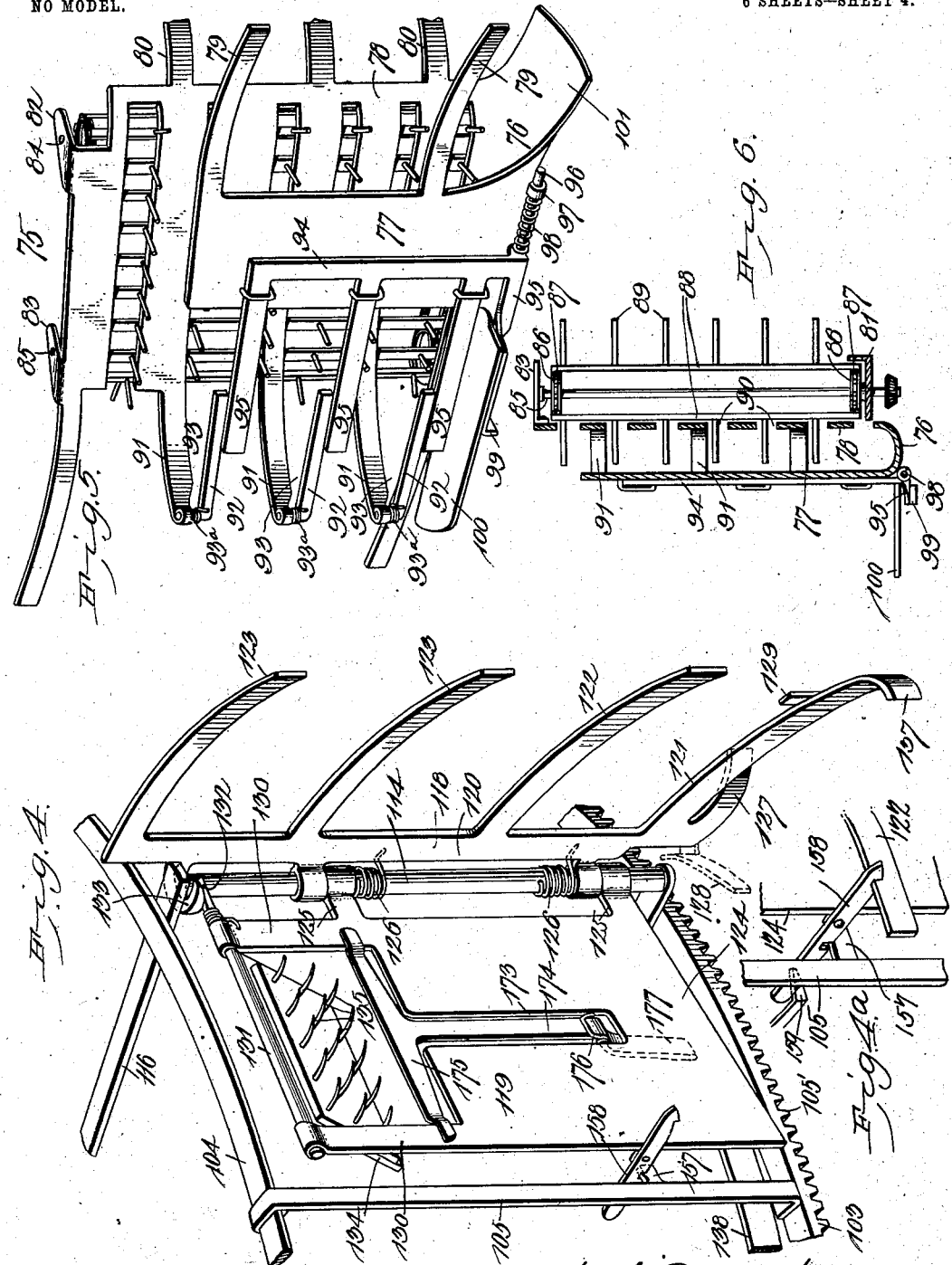

No. 729,971. PATENTED JUNE 2, 1903.
L. A. SPROUL.
MACHINE FOR HARVESTING BROOM CORN OR THE LIKE.
APPLICATION FILED JULY 31, 1902.
NO MODEL.
6 SHEETS—SHEET 5.
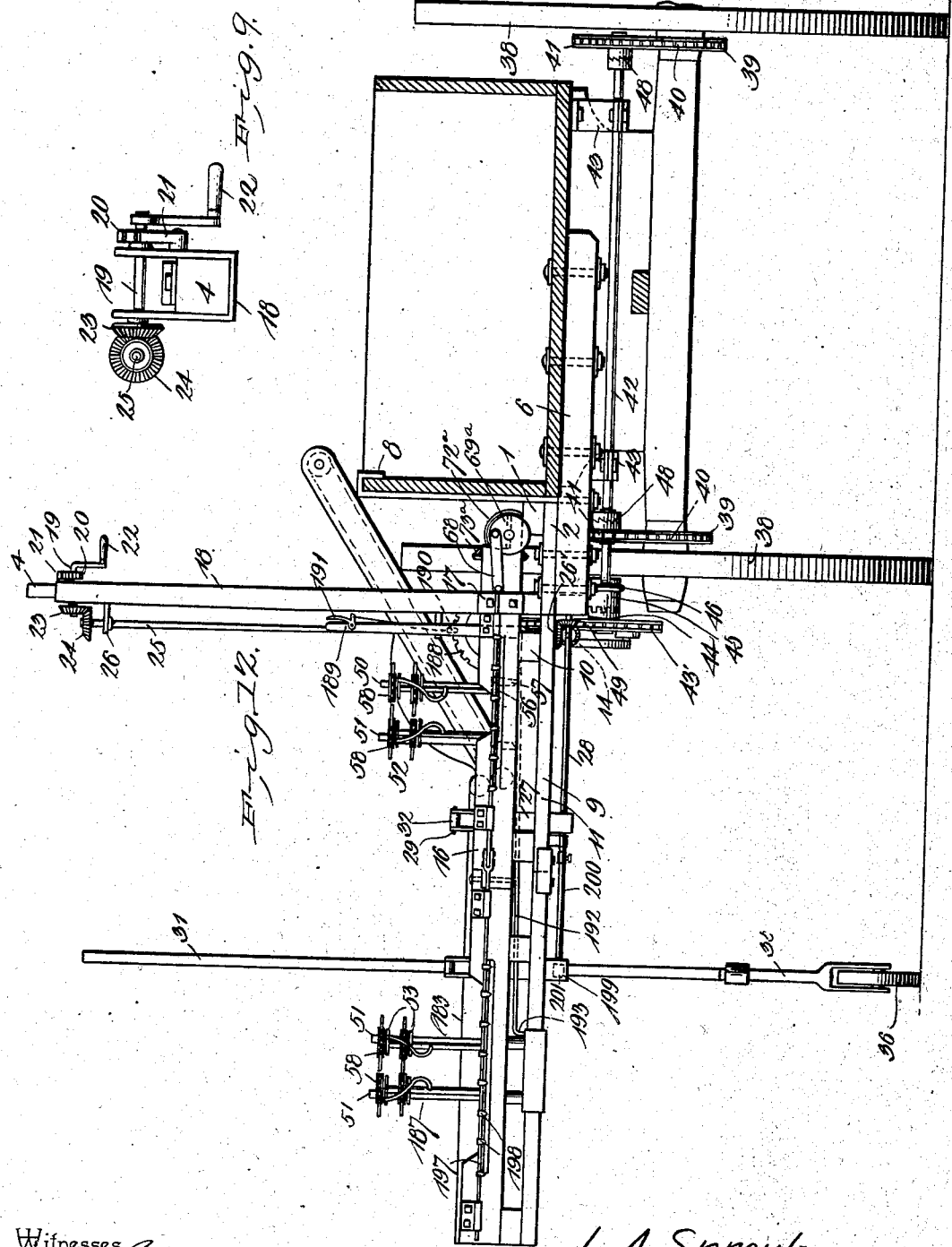
Witnesses
L. A. Sproul, Inventor.
by C A Snow & Co
Attorneys No. 729,971. PATENTED JUNE 2, 1903.
L. A. SPROUL.
MACHINE FOR HARVESTING BROOM CORN OR THE LIKE.
APPLICATION FILED JULY 31, 1902.
NO MODEL. 6 SHEETS—SHEET 6.
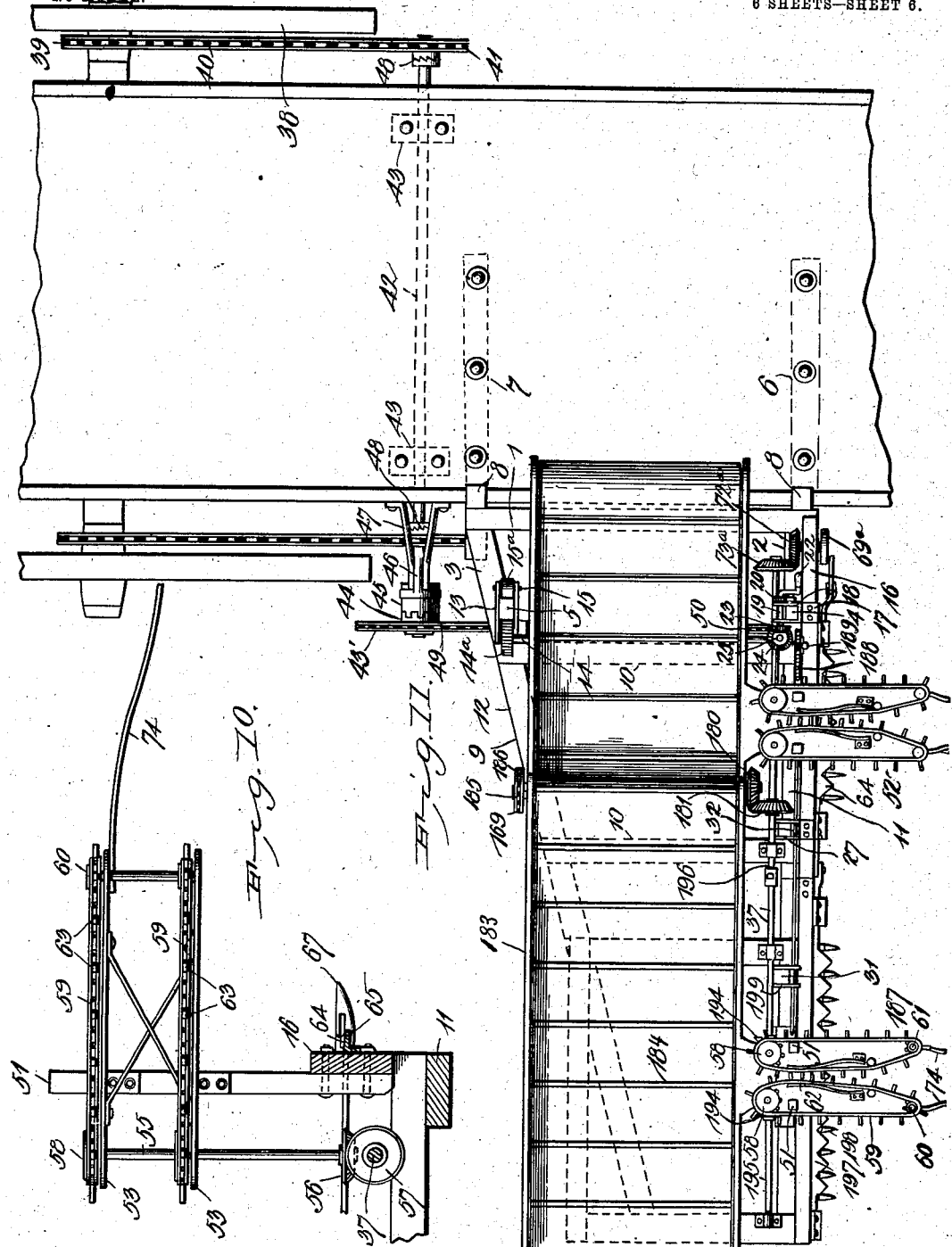

No. 729,971. Patented June 2, 1903.

UNITED STATES PATENT OFFICE.

LARK ATHEN SPROUL, OF EDMOND, KANSAS.

MACHINE FOR HARVESTING BROOM-CORN OR THE LIKE.

SPECIFICATION forming part of Letters Patent No. 729,971, dated June 2, 1903.

Application filed July 31, 1902. Serial No. 117,859. (No model.)

*To all whom it may concern:*

Be it known that I, LARK ATHEN SPROUL, a citizen of the United States, residing at Edmond, in the county of Norton and State of Kansas, have invented a new and useful Machine for Harvesting Broom-Corn or the Like, of which the following is a specification.

This invention relates to machines for harvesting broom-corn, Kafir corn, cane, and similar crops by "heading" or "topping" the same; and it has for its object to provide a farm implement of this kind which shall be readily adaptable to the crops to be operated upon and which shall possess superior advantages in point of simplicity, durability, and general efficiency.

With these ends in view my invention consists in the improved construction, arrangement, and combination of parts which will be hereinafter fully described, and particularly pointed out in the claims.

In the accompanying drawings, Figure 1 is a plan view of my invention as adapted for harvesting broom-corn, the same being shown applied to the side of a wagon-box in operative position. Fig. 2 is a front elevation of the same. Fig. 3 is a vertical sectional detail view taken on the line $x\ x$ in Fig. 1 and looking in the direction of the wagon upon which the device is supported, the endless carrier being omitted. Fig. 4 is a detached perspective detail view showing a portion of the packing drum or cylinder, which constitutes an important feature of the broom-corn harvesting device. Fig. 4$^a$ is a perspective detail view illustrating the construction and arrangement of the double latch 158 and its related parts. Fig. 5 is a detached perspective view of the receiving and carrying device, by means of which the broom-corn is conveyed from the cutting mechanism to the packing-drum. Fig. 6 is a transverse sectional view of the device shown in Fig. 5. Fig. 7 is a detail view of the shaker used in connection with the packing-drum. Fig. 8 is a detail view of the lower end of the rack-bar 31 with its spring-mounted supporting-wheel. Fig. 9 is a detail top view of the rack-bar 4 and related parts. Fig. 10 is a detail sectional elevation of the cutting and carrying apparatus. Fig. 11 is a plan view showing the adaptation of my invention for harvesting corn. Fig. 12 is a front view of the same.

Corresponding parts in the several figures are indicated by like characters of reference.

The main supporting-frame of my improved harvesting-machine is composed of a beam 1, provided at its front and rear ends with laterally-extending arms or brackets 2 and 3, the latter of which is preferably inclined diagonally in a forward direction. The said arms or brackets support vertical uprights or posts 4 and 5, having teeth or cogs formed thereon, the purpose of which will appear hereinafter. This supporting-frame when the machine is in use is itself supported upon the projecting ends of bars or beams 6 and 7, which may be bolted or otherwise suitably secured transversely under the bed of the wagon to which the machine is to be attached for operation. The said beams are provided with upwardly-extending hooks 8, which are hooked over the upper edges of the sides of the wagon-box, thus forming a very secure support for the machine. The supporting-frame of the machine proper is to be bolted or otherwise suitably secured upon the projecting ends of the beams 6 and 7.

9 designates a vertically-adjustable frame which is composed, essentially, of the side pieces 10 10, front piece 11, and diagonal rear piece 12, the said front and rear pieces supporting the side pieces of the same, as shown. The rear inner corner of the frame 9 supports a casing 13, which embraces the vertical rack-bar 5 and is provided with bearings for the shafts 14 and 15 of a pinion 14$^a$, which engages the said rack-bar, and a guide-roller 15$^a$, bearing against the opposite side for the purpose of steadying the motion thereof. The frame 9 is also provided with a front piece 16, suitably attached thereto and extending over the supporting-frame. Securely attached to this front piece by means of a holder 17 is a vertical casing 18, which reaches to the upper end of the rack-bar 4, the front and sides of which are inclosed by the said casing, which is U-shaped in cross-section. The upper end of the casing 18 is provided with bearings for a crank-shaft 19, carrying a ratchet-wheel 20, which is engaged by a pawl 21 to keep it from backward movement. The crank-shaft 19 also has an operating-handle 22, and at its opposite end it is connected by miter-gearing 23 24 with the upper end of the vertical shaft 25, the bearings of which are in brackets 26 upon the side of casing 18. The lower end of the shaft 25 carries a bevel-wheel 26'.

The frame 9, when the device is used as a broom-corn harvester, is also provided at or near its outer front corner with a casing 27 about similar to the casing 13 and provided with bearings for shafts 28 and 29, the former of which carries pinions 30, engaging the vertically-movable rack-bars 31 and 4, and the latter of which supports a guide-roller 32, bearing against the rear side of said rack-bar. The shafts 28 and 14 are extended in the direction of the vertical shaft 25, suitable bearings being provided for said shafts, and they carry at their ends bevel-gears 33 and 34, that engage with the bevel-gear 26' at the lower end of shaft 25. The rack-bar 31 is provided at its lower end with a curved spring-support 35, having bearings for a wheel or caster 36, traveling upon the ground and supporting the outer end of the machine. It will be seen that by operating the crank 22 the casing 18, supported upon the frame 9, may be raised or lowered upon the supporting-bar 4. This motion is transmitted by the means described to the pinions 14ª and 30, engaging the rack-bars 5 and 31, respectively, thus raising or lowering the frame 9 to any desired point, while the outer portion of said frame remains supported by the spring-supported wheel at the lower end of the rack-bar 31.

37 designates the main drive-shaft, which is mounted in suitable bearings upon the forward part of the frame 9, approximately parallel to the front cross-piece 11 of the latter. Motion is transmitted to this shaft from the traction-wheels of the wagon upon which the machine is supported in the following manner:

The traction-wheels 38 are provided with sprocket-wheels 39, which may be in any suitable manner clamped or secured upon the hubs thereof. These sprocket-wheels are connected by chains 40 with sprocket-wheels 41 upon a shaft 42, which is journaled in suitable bearings 43 upon the under side of the wagon-bed. The shaft 42 is extended at one end and carries a sprocket-wheel 43', which is loose upon the said shaft and the hub of which is provided with a clutch member 44, engaging a sliding clutch member 45, which is mounted upon shaft 42 and adapted to be manipulated by means of a lever 46, so as to throw it into or out of engagement with the sprocket-wheel 43. The lever 46 may have pivotal connection with an arm or bracket 47, suitably connected with and extending laterally from the wagon-box. The sprockets 41 are preferably connected with the shaft 42 by means of clutch devices 48 of ordinary construction, which shall enable the wagon to be turned or backed without inconvenience or injury to the machinery operated from the said shaft 42. The sprocket-wheel 43' is connected by means of a chain 49 with a sprocket-wheel 50 upon the main drive-shaft 37, to which motion may thus be transmitted.

A guide-wheel 50ª is suitably mounted upon a spring 50ᵇ to take up slack in the chain 49, so as to keep the latter taut at all points of adjustment of the supporting-frame 9 of the device.

The parts which I have thus far described may be said to be common to all the different forms of my invention. Other parts to be hereinafter described—such as, for instance, the cutting mechanism—are also practically alike in the different forms which my invention partakes of, according to whether it is to be used as a broom-corn harvester or whether for the purpose of harvesting corn, Kafir corn, or cane, in which latter three cases the construction is not changed.

I shall now proceed to describe the construction and operation of this device as used for the purpose of harvesting broom-corn.

The forward part of the frame 9 is provided with suitably-disposed uprights 51 51, supporting the cutting and carrying apparatus, which as a whole is designated 52 and which comprises horizontal shelves 53 53, mounted in pairs upon the said uprights. The front ends of said shelves are inclined outwardly and diverging from each other, as shown at 54, so as to provide for the entrance between the said shelves of the material to be cut. At the rear ends of said shelves are mounted vertical shafts 55, the lower ends of which are connected by miter-gearing 56 57 with the main shaft 37, from which motion is thus transmitted to said shafts, the motion being such as to cause them to revolve in the direction indicated by arrows in Fig. 1 of the drawings. The shafts 55 support directly above the shelves 53 sprocket-wheels 58, over which extend chains 59, the forward ends of which are supported upon guide-rollers 60 and 61, mounted, respectively, at and near the front ends of the shelves 53, the latter rollers being located at the points at which said shelves diverge outwardly, the function of these guide-rollers being to hold the chains properly in position practically parallel to the inner edges of the shelves 53 and the diverging front ends of the same. Guide-flanges 62 in the nature of springs having attached front ends and free rear ends that press outwardly against the chains 59 are also provided for the purpose of pressing or forcing the said chains on opposite shelves in the direction of each other so as to take a firm grip or hold upon the corn passing between them. The chains 59 or the links of said chains or carriers are provided with pins or studs 63 to engage the corn passing between the carriers and conduct it in a rearward direction to be operated upon by the cutters 64, which are mounted upon an ordinary cutter-bar 65, mounted slidingly in bearings 66 upon the front part of the frame 9. Guard-fingers 67 of ordinary construction may also be provided. Motion is transmitted to the cutter-bar 65 by means of a pitman 68 from a crank-disk 69 upon the front end of a shaft 70, mounted in a box 71 upon the front part of the frame 9. The rear end of the shaft 70 is connected by miter-gearing 72 73 with the main shaft 37, from which motion is thus transmitted to the cutting apparatus.

The front ends of the shelves 53 are provided with downwardly and outwardly diverging springs 74, which serve to guide slanting and uneven stalks between the diverging front ends of the shelves supporting the endless carriers. The latter, seizing the stalks between them by means of their pins or prongs 63, will guide the stalks rearwardly to the cutting apparatus, where the said stalks will be severed, their upper ends being discharged at the rear ends of the carriers of the cutting apparatus. I desire it to be understood that the carriers comprised by the chains 59 and their supporting parts are to be considered as a part of the cutting apparatus.

From the cutting apparatus the broom-corn or the tops of the stalks which constitute the article of commerce known as "broom-corn" are delivered to the receiver (illustrated in Fig. 4 of the drawings) and where it accumulates until delivered into the packing-drum, which will be hereinafter described.

I shall now proceed to describe the receiver. This device, which as a whole is designated 75, may be described as comprising the curved or approximately U-shaped base 76, suitably supported upon the frame 9 and having side walls 77 78, that diverge in a forward direction and are provided with further diverging receiving-arms 79 80, which are adapted to receive the "broom-corn" as it is delivered, standing, from the carriers of the cutting apparatus. The base 76 supports a flanged shelf 81, and the side wall 78 is provided at its upper end with laterally-extending brackets 82 and 83. These brackets and the said shelf are provided with bearings for vertical shafts 84 and 85, carrying sprocket-wheels 86 near their upper and lower ends. These sprocket-wheels support the chains 87, which are connected by upright or vertical slats 88, having series of outwardly-projecting prongs 89. These pronged slats, chains, sprocket-wheels, shafts, and supports constitute an endless carrier by means of which the broom-corn is conveyed, standing, to the packing compartment at the rear part of the device. The side wall 78 is provided with horizontal slots 90, through which the prongs of the slats 88 may extend to seize upon the corn, as will be readily understood. The stalks during their passage through this part of the device are partially supported and prevented from dropping by the curved or trough-like base 76. The wall 78 is provided at its rear end with arms 91, which are curved in the direction of the opposite wall 77. At the rear end of these curved arms are pivotally mounted rods 92, actuated by means of coiled springs 93$^a$, which force the said rods inwardly in the direction of the wall 78. The recesses 93 between the arms 91 and the pivoted rods 92 constitute a packing-chamber in which the broom-corn accumulates as it is carried rearward by the endless carrying device already described. Suitably supported upon the wall 77 of the receiver is a sliding gate 94, having rearwardly-extending arms 95, which when the gate is at the rearward limit of its movement overlap the pivoted rods 92. The gate is provided at its lower front corner with a forwardly-extending arm 96, having a bearing in a loop or eye 97 upon the under side of the plate or base 76. Between the loop 97 and the vertical front portion of the gate is interposed a spring 98, coiled upon the arm 96 and serving to force the said gate in a rearward direction, where its arms 95 will normally coact with the pivoted rods 92 to form the packing-space 93. The lowermost gate-arm 95 is provided near its rear end with a downturned portion forming a lug or stud 99, whereby the said gate is operated, as will be hereinafter described. It will be observed that this stud is located very nearly on the level of the spring 98, so that pressure exerted in a forward direction upon the said stud will act directly against the tension of said spring. The base of the receiver at its rear end is bent or curved outwardly in the direction of the packing-drum (to be presently described) so as to form a flat horizontal shelf 100, which is level with the bottom of the U-shaped trough forming the said base. This shelf, it will be observed, is disposed between the two lowermost arms of the gate 94, and it is an indispensable feature of the receiver, inasmuch as without this conformation the lower ends of the stalks would be unable to clear the side of the trough in the act of being removed from the packing-chamber. The operation of this part of the device will be very clearly understood by reference to Figs. 1 and 4 of the drawings. The corn is delivered from the endless carriers of the cutting apparatus directly between the arms 79 80, constituting the mouth of the receiver, where it is caught by the endless carrier and caused to continue its rearward movement into the packing space or chamber 93, where it accumulates until removed by means which will be presently described. I prefer that the base 76 should be extended forwardly, as shown at 101, so as to prevent any portion of the corn from being dropped between the carriers, which, however, should be located so closely together that the corn will be naturally transferred from the one to the other. The transfer is facilitated by the fact that the broom-corn, as is well known, readily becomes intertangled. The flange at the outer edge of the shelf 81 serves to assist in holding the lower ends of the carrier-slats in their proper position.

The next part of my invention to be described is that which I have heretofore mentioned as the "packing-drum" and which, as a whole, is designated 102. This drum comprises in its structure the lower and upper rings 103 104, which are connected and spaced apart by means of uprights 105. The lower ring 103 is provided on its under surface with teeth or cogs 105', whereby it is supported upon pinions 106, 107, 108, and 109, the shafts of which are journaled in suitable bearings, supported by the frame of the machine. The pinion 109, whereby motion is transmitted to the said lower ring of the packing-drum, is mounted upon the counter-shaft 110, which carries a sprocket-wheel 111, connected by a chain 112 with a sprocket 113 upon the main shaft 37, from which it derives motion, which is in turn transmitted by means of the pinion 109 to the packing-drum. The pinions 106, 107, and 108 serve merely as supports for the said drum, although from the two latter motion is transmitted to active parts of the machinery.

I desire at this point to state that the packing-drum may be provided with two or more receptacles to receive the corn from the packing-chamber of the receiver; but for purposes of illustration a single one will suffice, and only one has accordingly been shown in the drawings hereto annexed.

114 designates a vertical post which may be secured between the upper and lower rings of the packing-drum between projections extending outwardly from the same or between radial cross-bars 115 and 116, extending across the said rings. The latter construction is preferred and has been shown in the drawings. The said cross-bars, it may be remarked, also serve to support a central vertical shaft 117, which in turn supports devices to be hereinafter described.

The post 114 supports a pair of hinged doors 118 and 119, the outer one of which is composed of a vertical hinge-bar 120, having laterally-extending curved arms, the said hinge-bar and arms constituting what I term the "outer" door. The lowermost arm of said door and the one next above it are numbered, respectively, 121 and 122. The upper ones, of which any convenient number may be used, are designated 123. The inner door 119 is composed mainly of a plate 124, having laterally-extending arms 125, whereby it is hinged upon the post 114. The spacing-bars 105 of the drum are so disposed that one of said bars shall be adjacent to the free edges of the doors, as clearly shown in Fig. 3 of the drawings. Springs 126, coiled upon and having each one end attached to the post 114, are arranged with their other ends bearing against the door 118, so as to force the latter normally shut with a pressure sufficient to retain the broom-corn when received between the inner and outer doors. The lower end of the hinge-bar 120 of the outer door is provided with an outwardly turned or beveled projection 127, which is adapted when the drum revolves to engage a cam-plate 128, suitably disposed upon the frame 9, so as to force the door 118 open against the tension of the springs 126, to the position shown in Fig. 4. The curved arms of said door are so disposed as to engage between, above, and below the arms forming the packing-space of the receiver, and the cam 128 is so disposed that the door 118 shall be thrown open just before reaching the said receiver, so that the arms of said door shall assume a position behind those constituting the receiving-chamber and as the drum continues its revolution pass between said arms and grasp a portion of the broom-corn which has accumulated in the packing-space. The lowermost arm 121 of the door 118 is provided with a stud or projection 129, which at this point engages the stud 99 of the sliding gate 94 of the receiver, forcing the latter in a forward direction, and thus permitting the arms of door 118 to force the contents of the packing-space 93 outward against the tension of the spring-actuated arms or rods 92, which latter yield to the pressure exerted by the door 118 and at the same time serve to retain the broom-corn between themselves and the arms of said door while passing over the shelf 100. At this point the beveled projection 127 of the door 118 passes out of engagement with the cam 128 and the stud 129 likewise passes out of engagement with the stud 99. The door 118 is thus suddenly forced shut by the action of the springs 126, carrying with it the broom-corn, which is now confined between the two doors 118 and 119. At the same time the spring-actuated rods rebound to their normal position, and the sliding gate 94, being released from the forward pressure exerted by the stud 129 against the stud 99, is forced rearwardly by the spring 98. It will be observed that while this operation is performed no obstacle is interposed to the continued action of the endless carrier of the receiver. It is true that while the arms of the door 118 engage the said receiver for the purpose of removing the contents of the packing-chamber the broom-corn will be packed against the outer sides of said arms; but as soon as the door 118 is forced shut the broom-corn thus accumulated will pass directly into the packing-chamber to await the next operation of the packing-drum mechanism. The plate 124, which constitutes the body of the inner door, is provided with upwardly-extending arms 130, having bearing for a transverse shaft 131, one end of which is provided with a crank 132, adapted to be engaged by a cam 133, extending from the hinge-bar 120 of the outer door. The shaft 131 has a depending plate 134, fitting between the arms 130 and provided with forwardly-extending upwardly-turned prongs or barbs 135. It will be seen that when the outer door is thrown open the cam 133, engaging the crank 132, operates to throw the plate 134 in a rearward direction, as shown in Fig. 4. When the outer door is forced shut, a spring 136, coiled upon the shaft 131, operates to force the lower edge of the plate 134 in a forward direction, thus causing the prongs or barbs 135 to become entangled with the broom-corn and serving in connection with the spring-pressure exerted by the outer door to retain the broom-corn between the said outer and inner doors. The lowermost arm 121 of the outer door is bent inwardly at its outer end to form a projection 137, which when the door is forced shut comes in contact with a curved plate 138, concentric with the drum and carried by an arm 139, extending radially from the shaft 117. This device serves to prevent the said outer door from being closed completely by the tension of the actuating-springs 126. In other words, the said outer door not being closed to its full capacity the prongs 135 of the plate 134 are largely relied upon to keep the broom-corn in its position between the two doors. This is for the purpose of permitting the lower ends of the cornstalks to be acted upon by the shaking mechanism, to be presently described. It will be observed that the curved plate 138 is extended sufficiently to permit the lower ends of the broom-corn stalks to rest against it when the outer door is forced shut, so that it shall interpose no obstacle.

The outer side bar 10 of the frame 9 supports a cutting apparatus, the sickle-bar of which, 140, is mounted slidingly in bearings 141 and is connected by a pitman 142 with a crank-disk 143 upon the end of the counter-shaft 110. The frame-bar 10 has a bracket 144, which supports one end of a shaker 145, the other end of which is supported in a bearing 146 upon the front frame-bar. The said shaker comprises a pair of diverging arms 147, curved so as to conform somewhat to the curvature of the packing-drum and extending rearwardly to the forward rotation of the drum. The arms 147 are connected by a cross-bar 148, and each of said arms is provided with a laterally-extending slide 149, whereby the device is mounted in the bearings 144 146, already described. A vibratory motion is imparted to the shaker 145 by means of a pitman 150, connecting one of the slide-arms 149 with a crank-disk 151, mounted upon a shaft 152, journaled in a suitably-supported bracket 153, and having a gear-wheel 154, which may be connected either directly or by intermediate pinion 155 with a gear-wheel 156 upon the counter-shaft 110.

As the doors of the packing-drum, holding the broom-corn between them, pass the shaker 145 the lower ends of the stalks will enter between the arms of said shaker, and being held comparatively loosely, owing to the stud 137 upon arm 121 of the outer door engaging the curved plate 138, the cornstalks will be shaken and permitted to settle until the stud 137 passes out of engagement with the plate 138. At this point the full strength of the tension of springs 126 will be exerted to clasp and hold the corn firmly between the doors 119 and 118, and the lower ends of the broom-corn stalks are now presented to the cutting apparatus, whereby they are trimmed off smoothly and evenly.

The upright 105, which is located adjacent to the edges of the doors and which may be termed the "door-post," is provided with a lateral stud or projection 157, normally engaged by the inner end of a double latch 158, which is pivotally connected with the edge of the door 119. When the packing-chamber formed by the doors 118 and 119 passes beyond the cutting apparatus, this latch comes into engagement with a trigger 159, carried upon a radial arm 160, extending from the shaft 117. The latch 158 being thus released from its engagement with the projection 157, the other end of said latch will by the same operation be thrown into engagement with the arm 122 of the outer door 118, thus latching the two doors together and permitting both of them to swing outwardly.

A transverse bar 161, forming a part of the frame 9, supports in suitable bearings a shaft 162, carrying a spiked roller 163, and is also provided with a pinion 164, meshing with the supporting-pinion 107 of the packing-drum, from which it receives motion. Suitably disposed in front of the shaft 162 is a cam 165, adapted to engage the beveled projection 127 at the lower end of the door 118, which is thus swung outwardly; but at this stage, being connected by the latch 158 with the inner door 119, the latter is carried or swung with the outer door in an outward direction, thus presenting the sides of said doors to the shaft carrying the spiked roller, by the rotation of which the "boots" are removed from the lower ends of the cornstalks. It will be noticed that the doors are thrown open against the tension of the springs 126, the action of which springs as soon as the cam 165 and roller 163 are passed will restore the doors to their normal position. When the doors are thus forcibly shut by the action of the springs, the jarring to which the latch member 158 is subjected will suffice to disengage said latch member from its connection with the arm 122 of the outer door of the packing-chamber and to once more engage the projection 157. Being constructed with this end in view, the inner end of the latch member 158 may be suitably weighted, and I find it unnecessary to employ positive means for restoring said latch to its normal engagement with the lug 157.

166 indicates the frame of an elevator or endless carrier, which is to be suitably connected with and supported by the frame 9 at the rear side of the latter. The upper end of said elevator extends over the edge of the wagon-box to which the device is attached for operation and may be connected therewith and braced thereto in any suitable manner. The shaft 167, which supports the lower end of the apron or endless carrier 168 of the elevator, has a sprocket-wheel 169, connected, by means of a chain 170, with a sprocket-wheel 171 upon the shaft of the supporting-pinion 108, from which it receives motion.

172 designates a suitably-arranged cam adapted to engage with the beveled projection 127 at the lower end of the door 118 to open the latter as the part of the drum carrying said door approaches the elevator. When the door is thrown open, the cam 133, at its upper end engages the crank 132 of the shaft 131, thus throwing the plate 134 in an inward direction to the position illustrated in Fig. 4, and thus disengaging the prongs 135 of said plate from the broom-corn. This operation is timed to take place when the doors constituting the packing-chamber are directly opposite to the lower end of the elevator 168.

The plate 124, constituting the body of the door 119, is provided with a centrally-disposed vertical slot 173, extending to its upper edge, and near the lower end of said slot is pivotally mounted a lever 174, the upper end of which has a cross-head 175, extending entirely across the door and resting normally against the outer or front sides of the arms 130, being held in this position by the action of a spring 176, coiled upon the pivotal pin of the lever 174. The lower end of the lever 174 extends downwardly through the slot 173 and adjacent to the inner side of the door-plate, where it forms a trigger 177, adapted to be engaged by a tripping device 178, mounted at the outer end of an arm 179, which extends radially from the shaft 117. When this tripping device comes in contact with the trigger 177, the cross-head 175 at the upper end of lever 174 is forced outwardly against the tension of the spring 176. This operation is timed to take place at the exact time when the door 118 has been thrown open by the action of the cam 172 and the pronged plate 134 has been thrown back and out of engagement with the broom-corn by the action of the cam 133. The broom-corn thus released will be thrown by the action of the cross-head 175 suddenly and forcibly in an outward direction, thus depositing it heads outward (or rearward) upon the endless carrier of the elevator, whereby it is conveyed to the wagon-box. The operation of this part of my invention, which constitutes the broom-corn harvester, will, it is thought, be readily understood from the foregoing description. It will be seen that the broom-corn after being severed from the stalks by the cutting apparatus is conveyed by the endless carriers of the said cutting apparatus to the endless carrier of the receiver, whereby it is conveyed into the packing space or compartment of the latter. On its removal from said packing-compartment by the outer door of the packing-compartment of the revolving drum it is held in said compartment at first somewhat loosely in order to permit the lower ends of the stalks to settle down when acted upon by the shaking mechanism, afterward tightly while the lower ends of the stalks are being operated upon by the trimming mechanism. The broom-corn continues to be held tightly between the two doors constituting the packing-compartment while the said doors swing outwardly in order to subject the lower ends of the stalks to the action of the spiked roller. Afterward the packing-compartment is restored to its normal position by the action of the same springs which serve to hold the doors composing said compartment together. The outer door is then thrown open, and the contents of the packing-compartment is forcibly discharged upon the lower end of the elevator, whereby it is conveyed to the box of the wagon upon which the machine is mounted for operation. This completes the cycle of the operation of the operating-drum mechanism of the packing-drum, and as the latter continues its rotation the operation is repeated.

In order to convert the machine so that it may be utilized for the purpose of harvesting corn, Kafir corn, or similar crops, the most essential changes consist in removing from the frame 9 the receiver, the packing-drum, and the parts intimately related thereto. The elevator 166 is also removed from its support upon the rear side of the frame 9 and is now disposed upon or directly over the frame 9, which is provided with suitable bearings to receive the shaft supporting the lower end of the endless carrier of said elevator. This shaft 167 is deprived of the sprocket-wheel 169 and in place thereof is substituted a bevel-pinion 180, meshing with a similar pinion 181 upon the main shaft 37. The cutting mechanism is the same as is employed in the broom-corn harvester, although I may find it advantageous to move it somewhat toward the outer end of the supporting-frame and to operate the sickle-bar from the opposite or inner end of the frame, the operating mechanism here comprising, in addition to the pitman, the crank-disk 69$^a$ and the miter-gearing 72$^a$ and 73$^a$, being in this case disposed near the inner end of the main shaft. When the machine is used in this manner, I prefer to use in connection with it an extension whereby I am enabled to operate upon two rows simultaneously. This extension comprises a frame 183, having an endless carrier 184, said frame being suitably connected with the outer end of the frame 9. The shaft 167, at the rear end of which the sprocket-wheel 169 is now secured, is now connected, by means of a chain 185, with a sprocket-wheel 186 upon the shaft supporting the inner end of the endless carrier 184. Slidably disposed upon the front bar of the frame 183 is a carrying apparatus 187, which in all respects resembles the carrying apparatus 52 upon the frame 9. The latter frame is provided at its inner front corner with a segment-rack 188, which also serves as a brace to connect the front bar of said frame with the casing 18.

189 designates a lever fulcrumed centrally to the segment-rack 188 and having a dog or pawl 190, for the operation of which a handle 191 is provided. The lever 189 is suitably connected with a rod 192, having at its outer end a hook 193, engaging the slide which supports the carrying apparatus 187. By this means the said carrying apparatus may be adjusted to varying widths between the rows that are to be operated upon.

To provide for the transmission of motion to the endless carriers of the carrying apparatus 187, the bevel-gears 194, whereby the said carriers are driven, are mounted slidingly upon the squared portion 195 of a shaft suitably journaled upon the frame 183 and connected, by means of a suitable coupling 196, with the main shaft 37 upon the frame 9 of the machine. It will thus be seen that the carrier 187 may be moved laterally with relation to its supporting-frame without interfering with its operation. The cutting mechanism, which is here comprised of the sickle-bar 197 and finger-bar 198, is made sufficiently long to engage the corn presented thereto by the carrier 187 at any point of adjustment of the latter. The sickle-bar 197 is to be suitably connected with the sickle-bar 65 of the cutting apparatus upon the frame 9, from which it receives the necessary reciprocating movement. When the machine is used with this extension, I prefer to transfer the supporting device formed by the rack-bar 31, having the spring-supported roller 36, from the casing or socket 27 at the outer front corner of the frame 9 to a similar socket 199, located about midway of the front bar of the frame 183, which latter is thereby supported. The shaft 200 of the pinion 201, which here engages the rack-bar 31, is obviously in this case extended to and suitably connected with the shaft 28, carrying the bevel-gear 33, that engages with the bevel-gear 26 at the lower end of the shaft 25, which may be operated to adjust the supports of the machine. It is obvious that the use of this extension device, which simply enables the machine to operate upon two rows at a time in the place of one row only, is optional with the owner of the machine and is by no means necessary or indispensable. It has been here described and illustrated merely to show the working capacity of my invention is capable of being increased.

The general operation and advantages of my invention will be readily understood from the foregoing description, taken in connection with the drawings hereto annexed. Initially the machine is a broom-corn harvester, and when the difficult and somewhat-complicated nature of the work to be performed is taken in consideration the machine will be found not only simple, but also thoroughly efficient for the purpose of performing this work in a satisfactory manner. The machine is light and may be easily attached in the manner described to an ordinary farm-wagon, from the traction-wheels of which it derives its motive power. The frame which supports the operating mechanism of the machine may be easily and conveniently adjusted vertically, so as to operate upon plants of varying height, the supports 4, 5, and 31 being made of sufficient length to enable the operating parts of the machine to be raised to any height that may be required. This adjustment is effected by simply turning the crank-shaft 19, which may be easily done by means of the handle 22 by a person riding in the wagon. Apart from receiving the corn as it comes from the elevator and stowing it in the wagon-box, this is practically the only attention needed except when the machine is converted into a corn-harvester and the extension is used, when attention to the lever 189 will be needed to adjust the slidable carrying apparatus to enable it to engage inequalities in the rows.

With regard to the general structure of the machine I desire it to be distinctly understood that I do not limit myself as to the details of the same or with regard to the material employed. Minor changes in the construction and disposition of parts of the operating mechanism may also be made without departing from the spirit of my invention. In such changes I include the use of antifriction-rollers and other analogous devices whereby the friction upon the parts constituting the machine may be reduced and such parts be caused to work more harmoniously together. I also include any changes in the method of and means for transmitting motion which are well known in the art and which may be applied by a skilled mechanic. Particularly do I include the means for transmitting motion from the traction-wheels of a wagon to the machine supported by such wagon. In short, I desire it to be understood that any changes in the construction or disposition of the various members or elements of the device whereby the same result may be brought about and which may be carried into effect by any skilled mechanic are included within the scope of my invention.

Having thus described my invention, I claim and desire to secure by Letters Patent of the United States—

1. In a machine of the class described, the combination of cutting mechanism, carrying mechanism comprising forwardly-diverging shelves arranged in pairs, one above the other, guide-rollers mounted upon said shelves, endless carriers upon said guide-rollers, sprocket-wheels engaging said carriers and flat springs having fixed points of attachment upon the shelves and free ends engaging the endless carriers to force the latter in the direction of each other.

2. In a machine of the class described, the combination with stalk-severing means and endless carriers, of a receiver comprising a support, an endless carrier, a packing-space, and a sliding gate and hinged spring-actuated rods coacting to form the outer wall of said packing-space, substantially as set forth.

3. In a machine of the class described, a receiver having a curved stalk-supporting base, vertically-disposed walls, a sliding gate and pivoted arms coacting to form a packing-chamber, and an endless carrier for conveying the stalks between the walls into the packing-chamber.

4. In a machine of the class described, a receiver having a curved supporting-base, vertically-disposed walls, a sliding spring-actuated gate supported by one of said walls, arms extending from the other wall and having hinged spring-actuated rods coacting with said gate to form a packing-chamber, and an endless carrier for conveying the stalks, standing, between the walls into the said packing-chamber, substantially as set forth.

5. In a machine of the class described, a receiver having a supporting-base, vertically-disposed walls, one of said walls having slots, an endless carrier provided with vertically-disposed slats having prongs extending through the slots in the wall adjacent thereto and supporting means for said carrier, and a packing-chamber at the rear ends of the walls, the outer wall of said packing-chamber being formed by pivotally-movable rods and longitudinally-movable arms overlapping at their meeting ends, substantially as set forth.

6. In a machine of the class described, a receiver having a packing-chamber, one wall of said packing-chamber being formed by pivotally-movable rods and longitudinally-movable arms, normally overlapping each other, substantially as set forth.

7. In a machine of the class described, a receiver having a supporting-base and vertically-disposed walls, a packing-chamber at the rear end of said receiver having one wall composed of pivoted spring-actuated rods and sliding spring-actuated arms normally overlapping each other, and an endless carrier for conveying the stalks between the walls of the receiver into said packing-chamber, substantially as set forth.

8. In a machine of the class described, a receiver having a curved supporting-base provided at its rear end with a discharge-flange extending laterally from the bottom of said curved base, substantially as set forth.

9. In a machine of the class described, a receiver having a curved supporting-base provided at its rear end with a packing-chamber having a yieldable wall or closure and with a horizontally-disposed discharge-flange extending laterally from the bottom of said base, directly below the packing-chamber at the rear end of said receiver, substantially as set forth.

10. In a machine of the class described, a receiver having a curved supporting-base, a discharge-flange extending laterally from the bottom of said base at the rear end thereof, vertically-disposed walls, a sliding spring-actuated gate supported by one of said walls, and hinged spring-actuated arms hinged to the opposite wall and coacting with the sliding gate to form a packing-chamber, said packing-chamber being disposed directly above the horizontal discharge-flange of the base, substantially as set forth.

11. In a machine of the class described, a receiver having a packing-chamber, the outer wall of said packing-chamber being formed by hinged spring-actuated rods and longitudinally-slidable arms, normally overlapping each other, in combination with means for operating said slidable arms and means for at the same time exerting pressure against the spring-actuated rods in the act of removing the contents of the packing-chamber, substantially as set forth.

12. In a machine of the class described, a receiver having a packing-chamber, one wall of said packing-chamber being formed by hinged spring-actuated rods and longitudinally-slidable spring-actuated arms, normally overlapping each other, in combination with means for forcing said slidable arms against the tension of the spring pressing the same, and means for at the same time exerting pressure against the spring-actuated rods in the act of removing the contents of the packing-chamber, substantially as set forth.

13. In a machine of the class described, a receiver having a packing-chamber one wall of which is composed of yieldable rods and slidable arms normally overlapping each other, and means for conveying material into said packing-chamber, in combination with means for engaging the material contained in the packing-chamber to exert an outward pressure against the yieldable rods, and means for engaging the support of the slidable arms to force the latter in a direction away from the yieldable rods, thereby permitting the egress of the contents of the packing-chamber, substantially as set forth.

14. In a machine of the class described, the combination with a rotary drum having a vertical post, of a packing-chamber composed of a pair of doors, independently hinged to said post, substantially as set forth.

15. In a machine of the class described, the combination of rotary supporting means, a packing-chamber composed of members occupying an inner and an outer position with relation to the axis of said supporting means, said members being independently hinged to said supporting means, a latch member for connecting the free end of the inner member of the packing-chamber detachably with the supporting means, and springs for forcing the outer member of said packing-chamber in the direction of the inner member thereof.

16. In a machine of the class described, supporting means including a post, a packing-chamber comprising members occupying respectively an inner and an outer position with relation to said supporting means, said members being independently hinged to the post of said supporting means, a latch member carried by the inner member of the packing-chamber and normally engaging the support, and springs forcing the outer in the direction of the inner member of said packing-chamber.

17. In a machine of the class described, the combination with suitable supporting means, of doors occupying an inner and an outer position with relation to said supporting means, said doors being independently hinged to such supporting means and coacting to form a packing-chamber, springs forcing the outer against the inner of said doors, a plate having hinged connection with the inner door and provided with forwardly-extending prongs, and means connected with the door for actuating the said pronged plate to throw it in a rearward direction when the said outer door is forced open.

18. In a machine of the class described, the combination with suitable supporting means, of doors occupying respectively an inner and an outer position with relation to said supporting means, said doors being independently hinged to said supporting means and coacting to form a packing-chamber, a pronged supporting-plate hinged to the inner door, and means connected with the outer door for actuating said supporting-plate when the said outer door is opened.

19. The combination in a machine of the class described, of rotary supporting means, a packing-chamber composed of an inner and an outer member so designated with reference to the center of the supporting means to which latter said outer and inner members are independently hinged, a double latch member pivotally connected with the inner door member of the packing-chamber, a stud upon the supporting means normally engaging one end of said latch member, and means for disengaging said latch member from said stud and thereby causing the other end of said latch member to engage the outer door member of the packing-chamber.

20. In a machine of the class described, the combination of rotary supporting means, a packing-chamber composed of an outer and an inner member, so designated with reference to the center of the supporting means, said outer and inner members being independently hinged to said supporting means, means for forcing the said outer in the direction of the said inner member, a latch member carried by the inner door member normally engaging the supporting means and having a notch to engage the outer door member of the packing-chamber, and means for swinging the members of the packing-chamber thus connected in an outward direction.

21. In a machine of the class described, the combination of rotary supporting means, a packing-chamber composed of an outer and an inner member, so designated with reference to the center of the supporting means, to which latter said outer and inner members are independently hinged, springs for forcing the outer in the direction of the said inner member, a latch member carried by the inner door member normally engaging the said supporting means and having a notch to engage the outer member of the packing-chamber, and means for engaging the outer member of the packing-chamber to force the members of the packing-chamber thus connected in an outward direction against the tension of the spring pressing against the outer member of said packing-chamber.

22. In a machine of the class described, the combination of rotary supporting means, a packing-chamber composed of an outer and an inner member, so designated with reference to the center of said supporting means, to which latter said outer and inner members are independently hinged, means for forcing the outer in the direction of the inner member of the packing-chamber, and means for temporarily intercepting the inward movement of said outer member under the impulse of said forcing means and thereby keeping said inner and outer door members temporarily spaced apart.

23. In a machine of the class described, the combination of rotary supporting means, a packing-chamber comprising an inner and an outer member so designated with reference to the center of the supporting means, said outer member consisting of a spring-actuated door provided with an inward extension and means independent of the supporting means of the packing-chamber for engaging the said inward extension and thus preventing the complete closing of the door under the impulse of its actuating-springs.

24. In a machine of the class described, the combination of rotary supporting means, a packing-chamber comprising an inner and an outer member, so designated with reference to the center of the supporting means, said outer member being a hinged spring-actuated door provided with an inward extension, means independent of the rotary supporting means for engaging said extension and thus temporarily preventing the closing of the door under the impulse of its actuating-spring, and means within the packing-chamber for assisting in supporting the contents thereof while the outer door member is prevented from being fully closed under the impulse of its actuating-springs.

25. In a machine of the class described, the combination of rotary supporting means, a packing-chamber having a spring-actuated door member provided with an inward extension in the direction of the center of the supporting means, means for engaging said extension and thus temporarily preventing the closing of the door under the impulse of its actuating-springs, a swinging plate having hooks adapted to engage and thus partially support the contents of the packing-chamber, and shaking means to engage the protruding ends of the contents of the packing-chamber below the same.

26. In a machine of the class described, the combination of rotary supporting means, a packing-chamber having a hinged spring-actuated door member provided with an inward extension in the direction of the center of the supporting means, means for engaging said extension and thus temporarily preventing the complete closing of the door under the impulse of its actuating-springs, supporting-hooks within the packing-chamber, and shaking means arranged to engage the lower ends of the contents of the chamber, while the door of the latter is incompletely closed.

27. In a machine of the class described, the combination of rotary supporting means, a packing-chamber comprising outer and inner door members, so designated with reference to the center of the supporting means, supporting-hooks within said packing-chamber, means for holding the said hooks normally in operative position, and means connected with the outer door of the packing-chamber for moving said hooks out of operative position when said outer door is thrown open.

28. In a machine of the class described, the combination of rotary supporting means, a packing-chamber composed of inner and outer door members, so designated with reference to the center of the supporting means, to which latter said door members are independently hinged, springs tending to force the said outer door shut, means for intercepting and temporarily preventing the complete closing of the door, and shaking means for engaging the lower ends of the contents of the packing-chamber while the outer door of the latter is thus temporarily held partially open.

29. In a device of the class described, the combination of rotary supporting means, a packing-chamber composed of inner and outer door members, so designated with reference to the center of the supporting means, to which latter said door members are independently hinged, springs tending to force the said outer door shut, means for intercepting and temporarily preventing the complete closing of said outer door, supporting-hooks within the packing-chamber, and shaking means for engaging the lower ends of the contents of said packing-chamber, while the outer door of the latter is temporarily held partially open.

30. In a machine of the class described, the combination of rotary supporting means, a packing-chamber comprising inner and outer door members, so designated with reference to the center of the supporting means, springs operating to normally close the outer door member, means for intercepting and temporarily preventing the complete closing of said outer door, supporting-hooks within the packing-chamber, shaking means for engaging the lower ends of the contents of said packing-chamber, while the outer door of the latter is temporarily held partially open, and cutting means for severing the said lower ends of the contents of the packing-chamber at the time when the means for holding the said outer door of the packing-chamber partially open ceases to be operative.

31. In a machine of the class described, the combination of rotary supporting means, a packing-chamber composed of an inner and an outer door member, so designated with reference to the center of the supporting means, to which latter said door members are independently hinged, springs tending to force the said outer door shut, means for intercepting and temporarily preventing the complete closing of said outer door member, supporting means within the packing-chamber in the form of curved prongs projecting from a hinge-plate and adapted to engage the upper ends of the contents of the packing-chamber, means for imparting to the lower ends of said contents a vibratory motion, and cutting means for severing the said lower ends of the contents of the packing-chamber at the time when the means for holding the outer door of said packing-chamber partially open ceases to be operative.

32. In a machine of the class described, the combination of rotary supporting means, a packing-chamber comprising an inner and an outer door member, so designated with reference to the center of the supporting means, spring means for actuating said outer door member, a latch connected with the inner door member for alternately connecting the latter with a support fixed on the supporting means and with the outer door member, a beveled projection upon said outer door, and cams disposed to engage said beveled projection at stated intervals to throw said door member open against the tension of its actuating-springs.

33. In a machine of the class described, the combination of rotary supporting means, a packing-chamber composed of an inner and an outer door member, so designated with reference to the center of the supporting means, to which latter said door members are independently hinged, springs tending to force the outer door member shut, latching means carried by the inner door member for alternately engaging the supporting means of the outer door member, means for forcing the outer door member open at stated times when disengaged from the inner door member, and means for swinging the doors constituting the packing-chamber outwardly from the supporting means at a stated time while connected by the latching means.

34. In a machine of the class described, the combination of rotary supporting means, a packing-chamber having hinge connection with said supporting means, means for throwing the said packing-chamber outward from the supporting means, and a spiked roller arranged to engage the lower ends of the contents of the packing-chamber while the latter is thrown thus outward, substantially as set forth.

35. In a machine of the class described, the combination of rotary supporting means, a packing-chamber composed of an inner and an outer door member, so designated with reference to the center of the supporting means, to which latter said door members are independently hinged, springs tending to force the outer door member shut, latching means carried by the inner door member for alternately engaging the supporting means and the outer door, means for forcing the outer door member open at a stated time while connected with the inner door member by latching means, a spiked roller adapted to engage the lower ends of the contents of the packing-chamber while the latter is thus swung outward, and means for restoring the packing-chamber to its normal position by pressing against the outer door member thereof when the means for swinging it outward ceases to be operative.

36. In a machine of the class described, the combination of rotary supporting means, a packing-chamber having hinge connection therewith, a spiked roller arranged radially to said supporting means, and means for swinging the said packing-chamber outward to a radial position, and for so holding it while the lower ends of its contents is being engaged by the said spiked roller, substantially as set forth.

37. In a machine of the class described, the combination of rotary supporting means, a packing-chamber having hinge connection therewith, a spiked roller arranged radially to said supporting means, means for swinging the said packing-chamber outwardly to a radial position and for holding it while the lower ends of its contents is being engaged by the said spiked roller, and means for restoring the said packing-chamber to its normal position when, at the time of leaving said spiked roller, the means for swinging it outward ceases to be operative, substantially as set forth.

38. In a machine of the class described, the combination of rotary supporting means, a packing-chamber having hinged inner and outer door members, so designated with reference to the center of the supporting means, a lever mounted pivotally in a slot in the inner member of the packing-chamber and having a cross-head at its upper end, and means for engaging the lower end of said lever to throw its upper end forcibly in an outward direction to eject the contents of the packing-chamber at a time when the outer door member of said chamber is open.

39. In a machine of the class described, the combination of rotary supporting means, a packing-chamber having hinged inner and outer door members, so designated with reference to the center of the supporting means, an ejecting device having hinge connection with the inner member of said packing-chamber, and means for operating the said ejecting device at a time when the outer door member of the packing-chamber is open.

40. In a machine of the class described, the combination of rotary supporting means, a packing-chamber having hinged inner and outer door members, so designated with reference to the center of the supporting means, a plate having hinge connection with the inner member of the packing-chamber and provided with curved prongs adapted to engage the contents of said chamber, means connected with the hinged outer door member to throw the said pronged plate out of operative position when the said outer door is thrown open, an ejecting device having hinge connection with the inner member of said packing-chamber, and means for operating the said ejecting device at a time when the outer door member of the packing-chamber is open.

41. In a machine of the class described, the combination of rotary supporting means, a packing-chamber composed of hinged inner and outer door members, so designated with reference to the center of the supporting means, a plate having hinge connection with the inner door member and provided with curved prongs adapted to engage the upper ends of the contents of the packing-chamber, means connected with the outer door member for throwing said pronged plate out of operative position when said outer door member is thrown open, an ejecting device having connection with the inner door member, means for holding the said ejecting device normally in contact with the said inner door member, and means for operating the said ejecting device at a time when the outer door member of the packing-chamber is open, thus forcibly ejecting the contents of said packing-chamber at a time when the pronged supporting-plate is thrown out of operative position.

42. In a machine of the class described, the combination of supporting means, a packing-chamber having an inner door member and an outer hinged spring-actuated door member, said door members being designated relatively inner and outer with reference to the supporting means, a plate having hinge connection with the inner member of the packing-chamber and provided with forwardly-extending curved prongs, means connected with the outer door member for throwing said pronged plate out of operative position when said outer door member is thrown open, an ejecting device having connection with the inner member of the packing-chamber, an endless carrier, means for opening the spring-actuated outer door member of the packing-chamber at a point opposite to said endless carrier, thus simultaneously throwing the pronged holding-plate out of operative position, and means for simultaneously operating the ejecting device, thereby forcibly ejecting the contents of the packing-chamber upon the endless carrier.

43. In a machine of the class described, the combination of rotary supporting means, a packing-chamber having an inner door member and a hinged outer door member, said door members being designated inner and outer with reference to the center of the supporting means, an ejecting device within said packing-chamber, an endless carrier and means for opening the outer door member of the packing-chamber and for operating the ejecting device at a time when said packing-chamber is opposite to the endless carrier.

44. In a machine of the class described, the combination with a receiver having a packing-space, one wall of which is formed of yieldable rods and slidable arms normally overlapping each other, of a packing-chamber and rotary supporting means for the same, said packing-chamber having door members designated respectively inner and outer with reference to the center of the supporting means, said outer door member being provided with arms to engage between the arms of the packing-space in the receiver to remove the contents from said packing-space.

45. In a machine of the class described, the combination of a receiver having a packing-space, yieldable rods and slidable arms constituting the outer wall of said packing-space, rotary supporting means, a packing-chamber mounted upon the latter and having a hinged door member provided with arms adapted to engage between the arms of the packing-space of the receiver, and means carried by said door for engaging and actuating the slidable arms forming a portion of the wall of the packing-space of the receiver.

46. In a machine of the class described, the combination of a receiver having a packing-space, one wall of which is formed by hinged spring-actuated rods and by the arms of a slidable spring-actuated gate, said arms and rods normally overlapping each other, rotary supporting means, a packing-chamber mounted upon the latter and comprising an inner door member and a hinged spring-actuated outer door member, said door members being designated inner and outer with reference to the center of the supporting means and said outer door member being provided with arms adapted to engage between the arms of the packing-space of the receiver, means for throwing said door open at a proper time to effect such engagement, and means carried by the outer door member of the packing-chamber for engaging and actuating the slidable gate of the receiver against the tension of its operating-spring.

In testimony that I claim the foregoing as my own I have hereto affixed my signature in the presence of two witnesses.

LARK ATHEN SPROUL.

Witnesses:
J. A. BROWN,
A. E. STICKNEY.